(12) United States Patent
Banginwar et al.

(10) Patent No.: US 8,060,762 B2
(45) Date of Patent: Nov. 15, 2011

(54) PROCESSOR POWER MANAGEMENT ASSOCIATED WITH WORKLOADS

(75) Inventors: Rajesh Banginwar, Hillsboro, OR (US); Eugene Gorbatov, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 380 days.

(21) Appl. No.: 12/325,746

(22) Filed: Dec. 1, 2008

(65) Prior Publication Data

US 2009/0083523 A1 Mar. 26, 2009

Related U.S. Application Data

(63) Continuation of application No. 11/169,975, filed on Jun. 29, 2005, now Pat. No. 7,475,262.

(51) Int. Cl.
*G06F 1/00* (2006.01)

(52) U.S. Cl. ............ 713/300

(58) Field of Classification Search .......... 713/300
See application file for complete search history.

(56) References Cited

U.S. PATENT DOCUMENTS

| | | | |
|---|---|---|---|
| 6,490,653 B1 | 12/2002 | Cargnoni et al. | |
| 6,535,798 B1 | 3/2003 | Bhatia et al. | |
| 6,985,952 B2 * | 1/2006 | Bohrer et al. | 709/226 |
| 7,089,430 B2 * | 8/2006 | Cooper | 713/300 |
| 7,184,003 B2 * | 2/2007 | Cupps et al. | 345/30 |
| 7,389,506 B1 * | 6/2008 | Miller et al. | 718/1 |
| 7,472,306 B2 * | 12/2008 | Tsui et al. | 713/600 |
| 7,668,703 B1 * | 2/2010 | Rolia et al. | 703/2 |
| 2002/0099514 A1 | 7/2002 | Watts, Jr. | |
| 2003/0093702 A1 | 5/2003 | Luo et al. | |
| 2004/0083400 A1 | 4/2004 | Saito et al. | |
| 2004/0093530 A1 | 5/2004 | Watts | |
| 2005/0071694 A1 | 3/2005 | Gonzalez et al. | |
| 2006/0092320 A1 * | 5/2006 | Nickerson et al. | 348/441 |
| 2006/0259743 A1 * | 11/2006 | Suzuoki | 712/220 |

OTHER PUBLICATIONS

IEEE Xplore Release 2.5, "Search Results for ( ((baginwar)>in>au) ) <and> (pyr>= 1950 <and> pyr <= 2005)", Sep. 30, 2008, 6pgs.

* cited by examiner

*Primary Examiner* — Mohammed Rehman
(74) *Attorney, Agent, or Firm* — Buckley, Maschoff & Talwalkar LLC (57) ABSTRACT

Some embodiments provide determination of a processor performance characteristic associated with a first workload, and determination of a processor performance state for the first workload based on the performance characteristic. Further aspects may include determination of a second processor performance characteristic associated with a second workload, determination of a second processor performance state for the second workload based on the performance characteristic, determination of a similarity between the first performance characteristics and the second performance characteristics, determination of a cluster comprising the first workload and the second workload, and association of a third processor performance state with the cluster, wherein the third processor performance state is identical to the first processor performance state and to the second processor performance state.

15 Claims, 9 Drawing Sheets

| Workload | L2 Cache Miss Ratio | Input/Output Queue Depth |
|---|---|---|
| A | .75 | 5 |
| B | .20 | 4 |
| C | .10 | 1 |
| D | .35 | 2 |

| Cluster | Performance State |
|---------|-------------------|
| 1 | P2 (2.8GHz, 1.6V) |
| 2 | P1 (3.2GHz, 1.7V) |
| 3 | P0 (3.6GHz, 1.8V) |

PROCESSOR POWER MANAGEMENT ASSOCIATED WITH WORKLOADS

CROSS REFERENCE TO RELATED APPLICATIONS

The present application is a continuation of U.S. patent application Ser. No. 11/169,975, filed Jun. 29, 2005, and entitled "Processor Power Management Associated with Workloads" (as amended).

BACKGROUND

A Central Processing Unit (CPU) may consume a significant amount of power during operation. Some conventional systems provide for operation of CPUs in one or more selectable performance states. For example, a CPU may be selectively controlled to operate at a first frequency and a first voltage (i.e., a first performance state) or at a higher frequency and higher voltage (i.e., a second performance state). The CPU may therefore consume less power in the first performance state than in the second performance state.

Determination of a CPU performance state is typically based only on a percentage utilization of the CPU. The CPU may be controlled to operate in a low performance state if the percentage utilization is below a threshold level, and in a higher performance state if the percentage utilization is above a threshold level. Systems that may provide more efficient operation are desirable.

DETAILED DESCRIPTION

Figure 1:
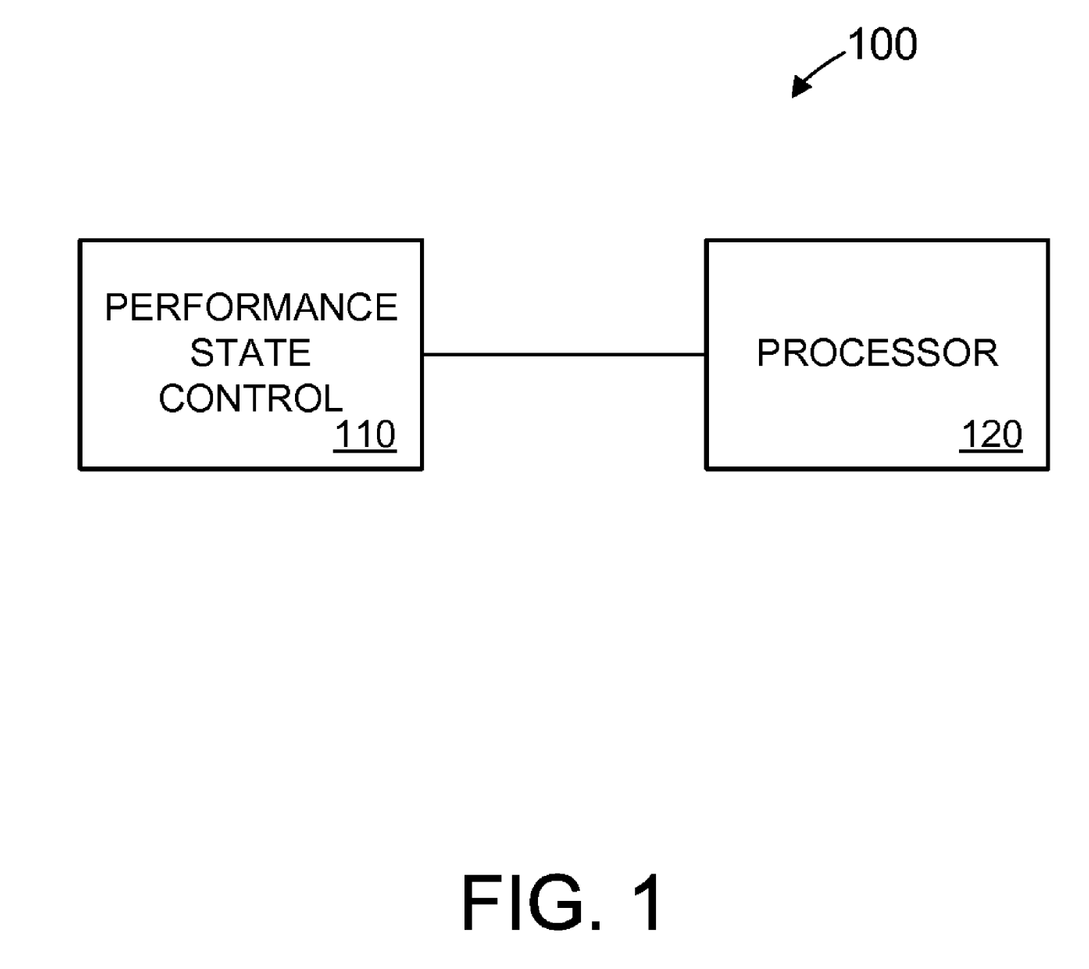
FIG. 1 is a block diagram of a system according to some embodiments.

FIG. 1 is a block diagram of system 100 according to some embodiments. System 100 includes performance state control 110 and processor 120. In some embodiments, performance state control 110 determines a performance characteristic of processor 120 that is associated with a first workload executed by processor 120, and determines a processor performance state for the first workload based on the performance characteristic.

Performance state control 110 may comprise any combination of hardware and/or software. According to some embodiments, performance state control 110 comprises operating system-level software executed by processor 120 to provide the functions described herein. Performance state control 110 may determine the above-mentioned performance characteristic by querying one or more operating system and processor performance counters before, during and/or after processor 120 executes the first workload.

A performance characteristic may comprise any information that indicates an efficiency of processor 120 with respect to a workload and that may be obtained from hardware or software. Performance characteristics may include but are not limited to a level two cache miss ratio, an input/output queue depth, a number of retired instructions, input/output throughput and latency, and memory access rate. A workload as described herein may comprise an operating system-level thread, a device driver, a task, an application, a thread of a multi-threaded application, and/or any other executable process for which performance characteristics may be determined.

Processor 120 may comprise any number of processing units. Processor 120 comprises a microprocessor integrated circuit (IC) in some embodiments. Processor 120 may support multiple controllable operational power and performance states. According to some embodiments, processor 120 supports the Advanced Configuration and Power Interface (ACPI) Specification Revision 2.0b (October, 2002), which defines a number of power and performance states.

Figure 2:
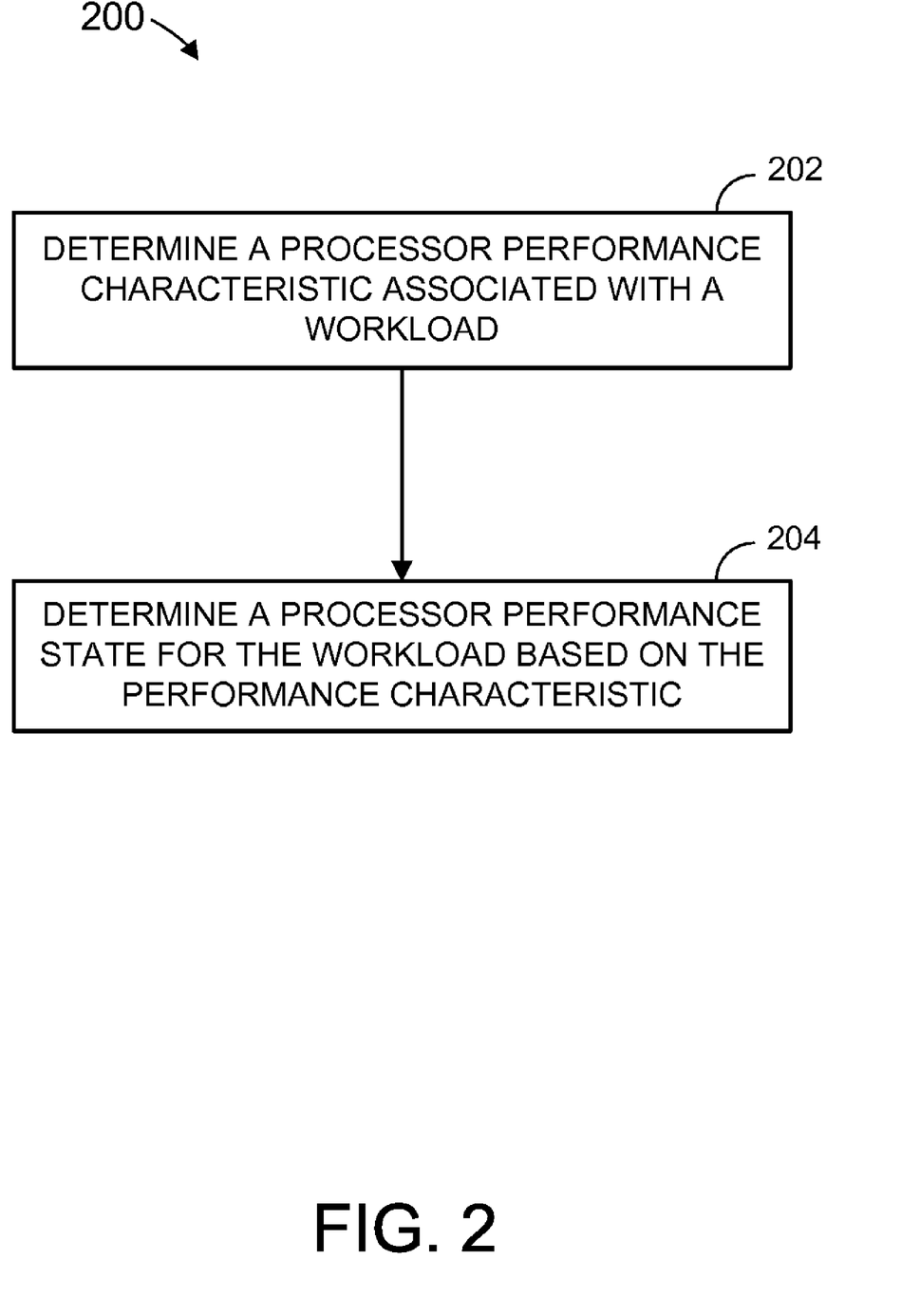
FIG. 2 is a flow diagram of a method according to some embodiments.

FIG. 2 is a flow diagram of a method according to some embodiments. The method of FIG. 2 may be executed by, for example, a system such as system 100 of FIG. 1. Note that any of the methods described herein may be performed by hardware, software (including microcode), or a combination of hardware and software. For example, a processor may be operative in conjunction with program code stored on a storage medium to perform methods according to any of the embodiments described herein.

Initially, at 202, a processor performance characteristic associated with a workload is determined. Using the FIG. 1 example, performance state control 110 may identify a workload executed by processor 120 and query performance-related counters of processor 120 or an operating executed by processor 120 to determine a performance characteristic associated with the workload. In the present example, it will be assumed that the processor performance characteristic is a 10% level two cache miss ratio.

Next, at 204, a processor performance state is determined for the workload based on the performance characteristic. Continuing with the present example, performance state control 110 determines that the high cache miss ratio indicates that the execution of the workload is memory-bound. Since the workload doesn't benefit from the current performance state, performance state control 110 determines a processor performance state that consumes less power than the current performance state. The determined performance state may be associated with a lower operating voltage and a lower operating frequency than the other performance state.

As will be described in detail below, some embodiments provide control of a processor based on the determined processor performance state. According to some examples, performance state control 110 instructs processor 120 to enter the determined performance state prior to executing the workload. Such control may conform to any protocol that is or becomes known, including but not limited to the above-mentioned ACPI specification.

Figure 3:
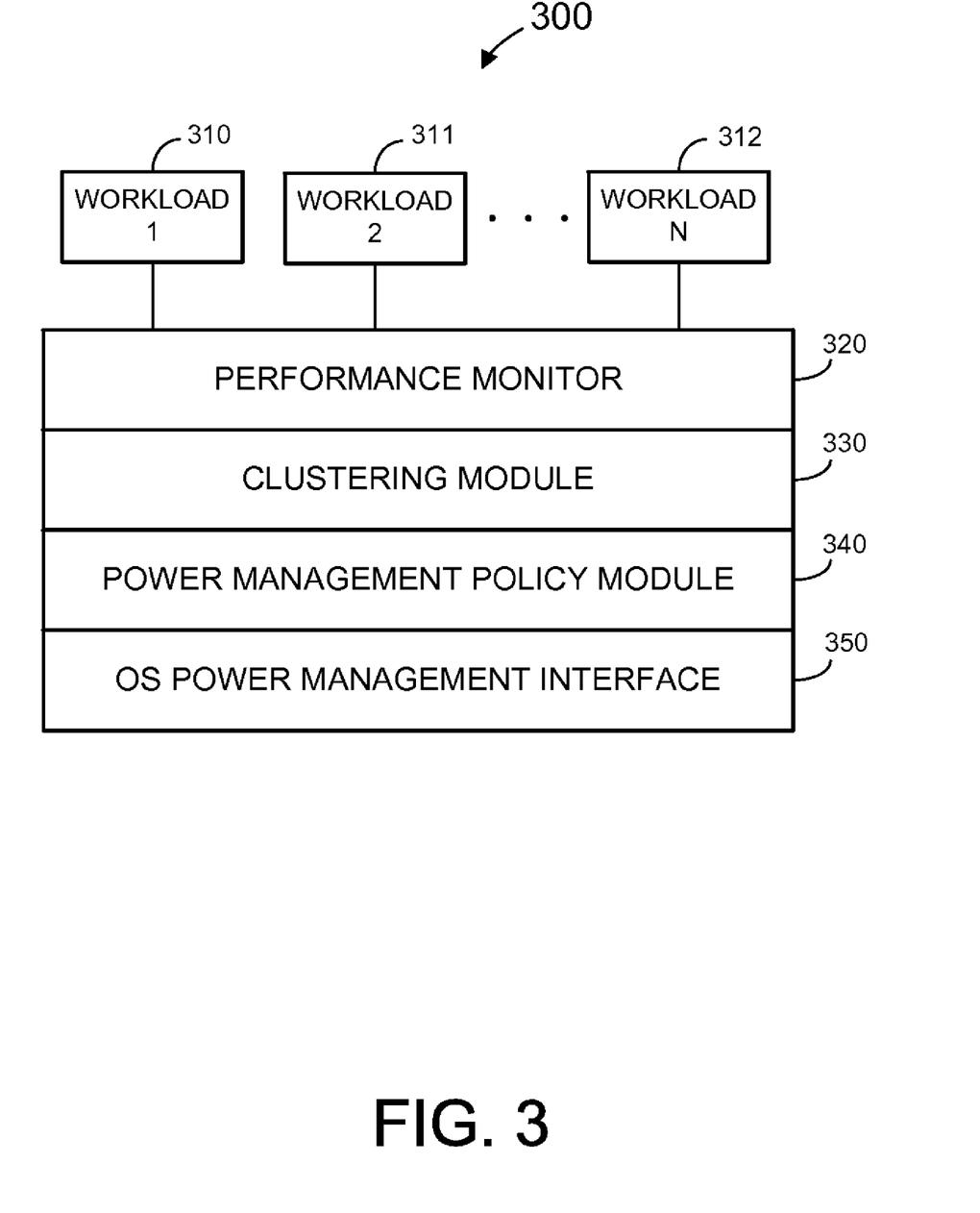
FIG. 3 is a block diagram of a code architecture according to some embodiments.

FIG. 3 is a block diagram of code architecture 300 according to some embodiments. Architecture 300 includes workloads 310 through 312, performance monitor 320, clustering module 330, power management policy module 340 and OS power management interface 350. The components of architecture 300 may operate to provide efficient control of processor performance states according to some embodiments.

Architecture 300 may comprise program code executed by a platform (not shown) including a processor and related components (e.g., motherboard, memory, etc.). As described above, workloads 310 through 312 may comprise applications, application threads, device drivers, operating system services, etc. Workloads 310 through 312 may operate in conjunction with operating system code represented by components 320 through 350.

Components 320 through 350 and other unshown operating system components may control hardware components of the platform based on instructions from workloads 310 through 312. One or more of components 320 through 350 may be embodied as services, layers, and/or core components of an operating system, and may be embodied as any other executable software component, including a dynamic link library or a stand-alone application.

Performance monitor 320 may determine performance characteristics associated with workloads 310 through 312. The performance characteristics may be based on performance-related values generated by operating system counters, processor counters, chipset counters, device-level counters, and/or any other system for generating a value that is or becomes known.

Clustering module 330 may determine a plurality of clusters based on the performance characteristics determined by performance monitor 320. Each cluster may comprise one or more of workloads 310 through 312, each of which is associated with similar performance characteristics. According to some embodiments, the workloads associated with a particular cluster exhibit similar software, micro-architectural, and/or device-level behavior. Such behavior may comprise any behavior suggesting that the workloads should be executed at a similar processor performance state.

Power management policy module 340 associates each cluster with a processor performance state. The processor performance state associated with a particular cluster may comprise a particular operating voltage and frequency, as in the example of the ACPI specification. The processor performance state may be intended to minimize processor power requirements while maintaining suitable performance of the workloads associated with the particular cluster. Determination of the processor performance state may include any known algorithms and/or may take into account information other than processor performance characteristics, including but not limited to processor percentage utilization information. Moreover, determination of the processor performance state might be associated with operating system power management policies that are configurable by the user. According to some embodiments, power management policy module 340 continuously monitors performance characteristics associated with workloads and updates processor performance states associated with clusters to which the workloads belong.

Power management policy module 340 passes the determined performance states to operating system power management interface 350. Interface 350 may then instruct a processor to execute workloads according to their determined performance states. Such an instruction may pass to an operating system layer, to a power management device driver (e.g., an ACPI driver), and then to the platform hardware. In some embodiments, interface 350 comprises the OS Power Management module of the ACPI specification.

Figure 4:
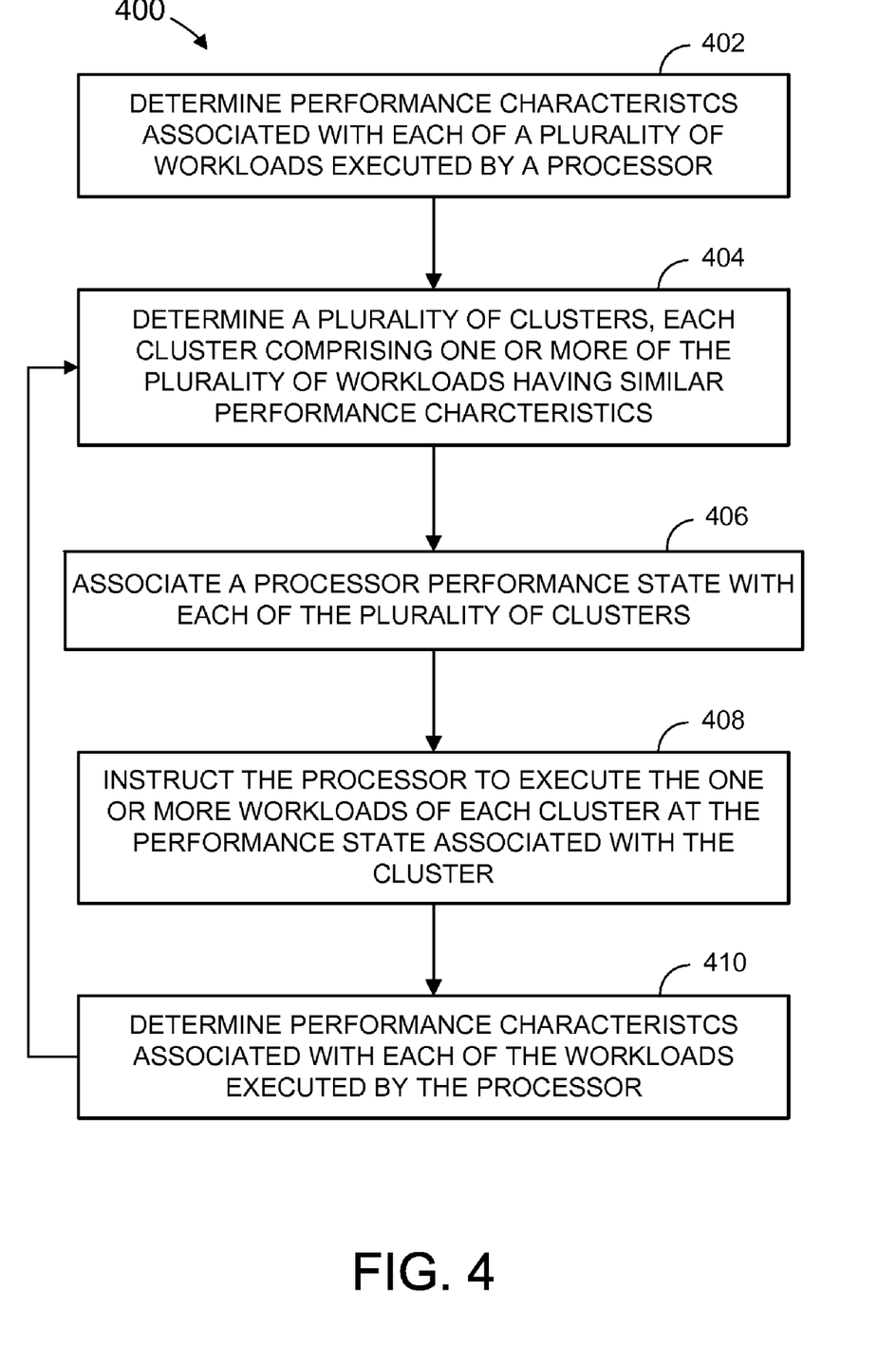
FIG. 4 is a flow diagram of a method according to some embodiments.

FIG. 4 is a flow diagram of a method according to some embodiments. Method 400 may be executed by, for example, a system such as system 100 of FIG. 1 and/or a code architecture such as architecture 300 of FIG. 3.

At 402, performance characteristics associated with a plurality of workloads executed by a processor are determined. Using the FIG. 3 example, performance monitor 320 may identify a workload executed by a processor at 402, query counters of the operating system, processor, or other hardware devices on the platform that are related to the workload, and determine a performance characteristic associated with the workload based on results of the query. Performance monitor 320 may determine more than one performance characteristic associated with the workload. Moreover, performance monitor 320 may determine one or more performance characteristics for an additional one or more workloads at 402.

Figure 5:
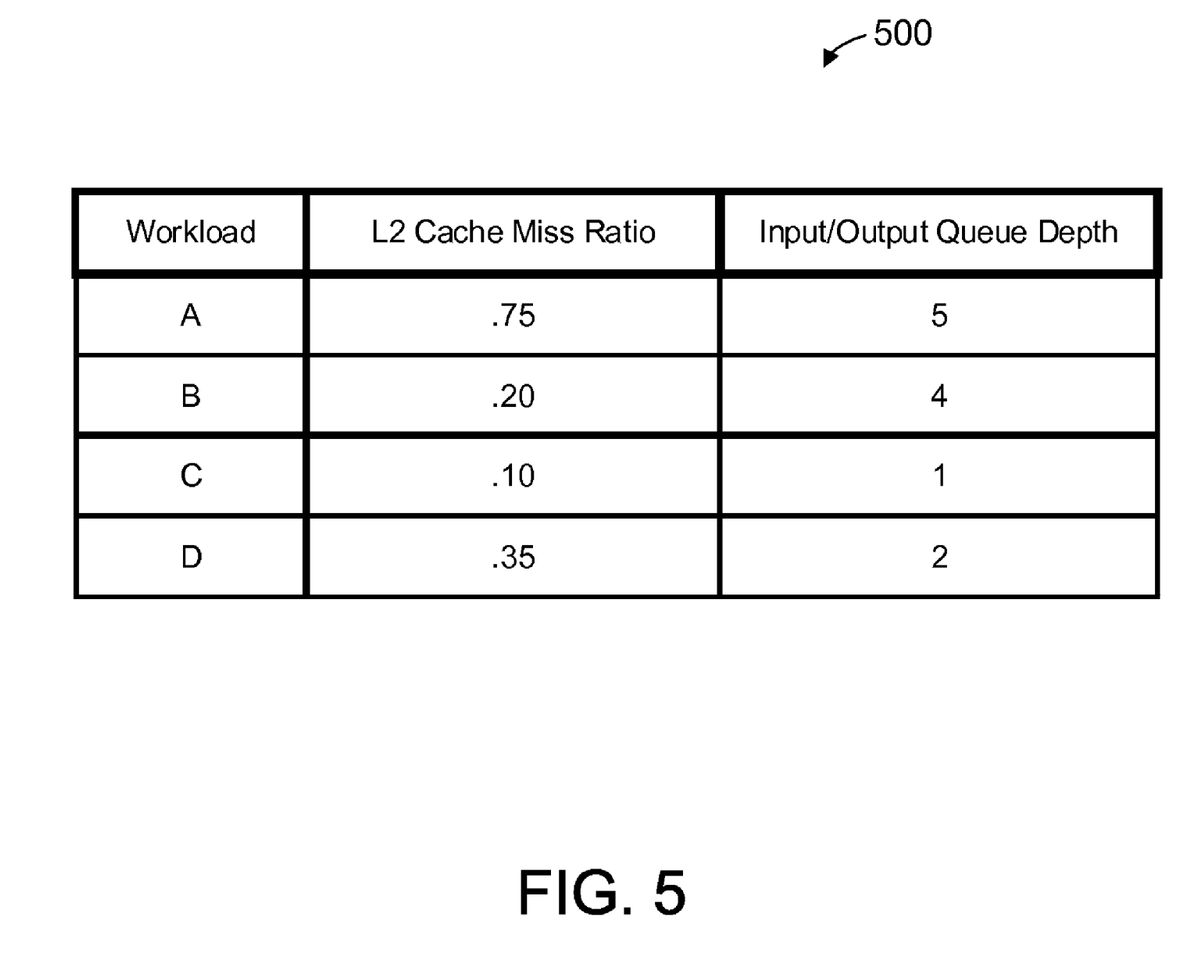
FIG. 5 illustrates a portion of a performance characteristic table according to some embodiments.

The determined performance characteristics may be stored for subsequent access. FIG. 5 illustrates a portion of a performance characteristic table according to some embodiments. Table 500 includes columns specifying a workload and several performance characteristics associated therewith. In particular, each workload is associated with a level two (L2) cache miss ratio and an input/output (I/O) queue depth. Some embodiments may operate in conjunction with alternative and/or additional and platform performance characteristics. Additionally, a history of performance counter values may be maintained for subsequent access.

Performance monitor 320 may populate table 500 according to some embodiments of 402. Table 500 and each other table described herein may be stored in one or more storage media, including but not limited to registers, random access memory, cache memory, and hard disk memory. Although the performance characteristics are illustrated in a tabular format, any currently- or hereafter-known data format and/or structure may be used to store the performance characteristics.

Next, at 404, a plurality of clusters is determined based on the determined performance characteristics. Each cluster may comprise one or more of the determined workloads that are associated with similar performance characteristics. In some embodiments, clustering module 330 of FIG. 3 may determine such clusters based on any suitable algorithm. For example, a cluster may include workloads that exhibit similar micro-architectural behavior when executed.

Figure 6:
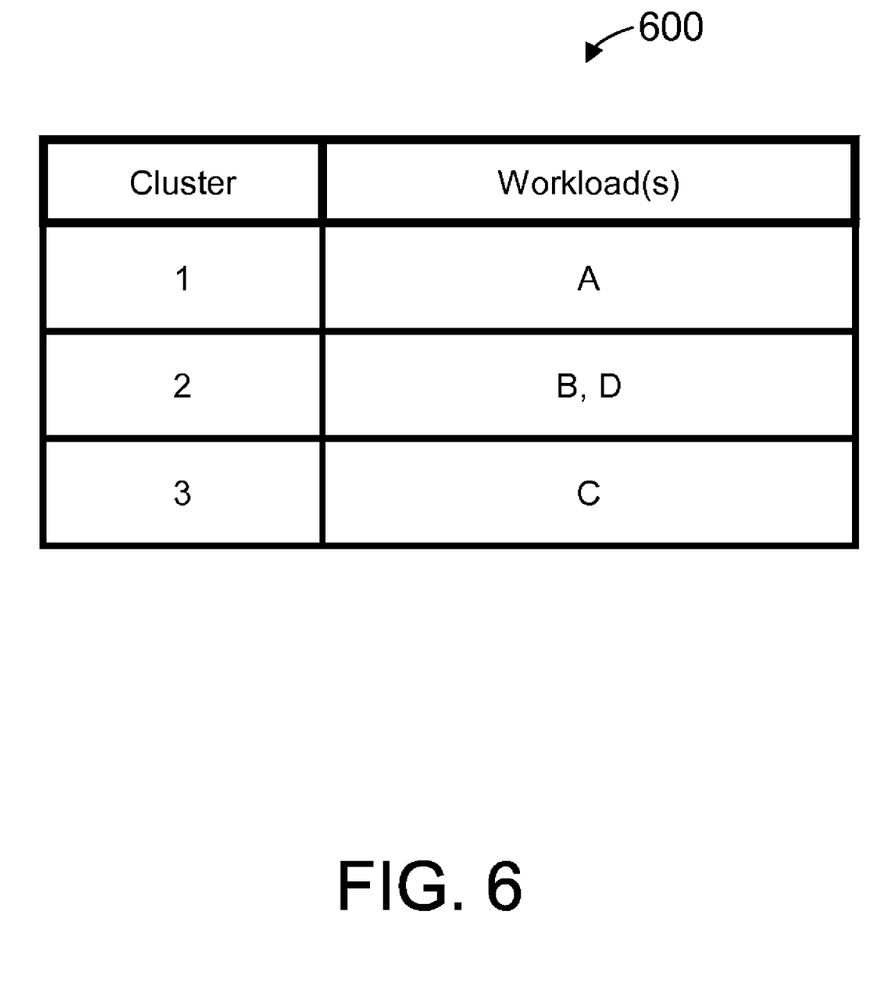
FIG. 6 illustrates a portion of a cluster definition table according to some embodiments.

FIG. 6 illustrates clusters determined according to some embodiments. Table 600 may be populated by clustering module 330 at 404 and associates each of a plurality of clusters with one or more workloads. The data of table 600 is based on the data of table 500. In particular, workloads B and D are associated with a same cluster (i.e., cluster 2) because similar performance characteristics are associated with these workloads in table 500. The performance characteristics associated with workloads A and C are not similar to performance characteristics of any other workload, therefore workloads A and C are associated with their own respective cluster.

Returning to process 400, a processor performance state is associated with each determined cluster at 406. According to some embodiments, power management policy module 340 associates each cluster with a processor performance state that is intended to minimize processor power requirements while maintaining a same or suitable level of performance of the workloads associated with the particular cluster. In the present example, it is assumed that high L2 cache miss ratio and I/O queue depth indicate that a workload is memory-bound. Accordingly, a cluster including such workloads may be associated with a lower frequency and voltage than a cluster including workloads associated with low L2 cache miss ratio and I/O queue depth.

Figure 7:
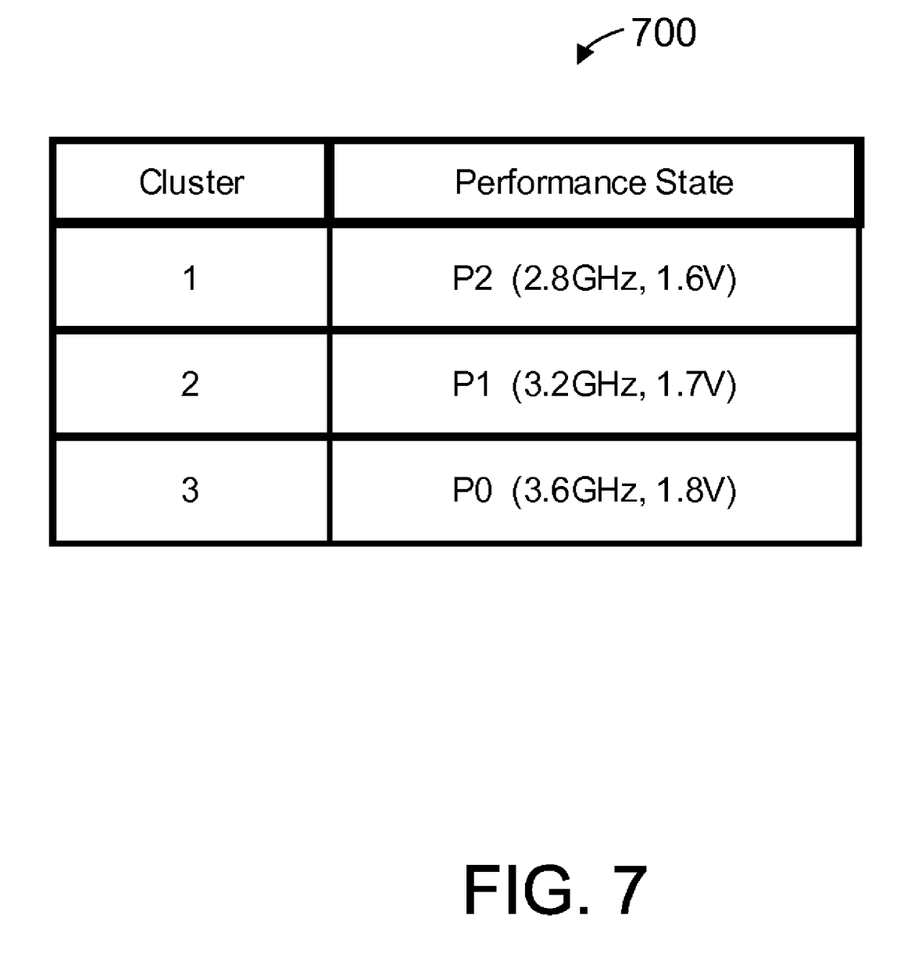
FIG. 7 illustrates a portion of performance state table according to some embodiments.

Table 700 of FIG. 7 illustrates performance states associated with each cluster according to some embodiments of 406. Cluster 1, consisting of workload A, is associated with a high performance state because workload A is associated with low L2 cache miss ratio and I/O queue depth. The other illustrated clusters are similarly associated with appropriate performance states.

The processor is then instructed at 408 to execute the one or more workloads of each cluster at the performance state associated with the cluster. For example, the processor may be instructed to change its operating frequency and voltage, and to then execute all workloads of a cluster that is associated with the changed frequency and voltage. According to some embodiments of 408, the processor is then instructed to again change its operating frequency and voltage, and to execute all workloads of a next cluster that is associated with the newly-changed frequency and voltage. Such changes of frequency and voltage may occur at context switches for increased efficiency.

The instructions at 408 may pass from interface 350 to an operating system layer, to a power management device driver, and then to the processor. In some embodiments, instructions at 408 are scheduled to avoid large jumps in processor frequency and voltage. For example, the processor may be instructed to execute workloads of a first cluster at a lowest frequency and voltage, to execute workloads of a second cluster at a higher frequency and voltage, and to then execute workloads of a third cluster at a highest frequency and voltage.

Performance characteristics are determined for each of the executed workloads at 410. This determination may proceed as described above with respect to 402. The performance characteristics may supplement or overwrite the performance characteristics that were previously determined for the workloads. Flow returns to 404 from 410 and continues as described above. As a result, the performance characteristics, clusters, and performance states associated with the clusters may be continuously updated during processor operation.

Figure 8:
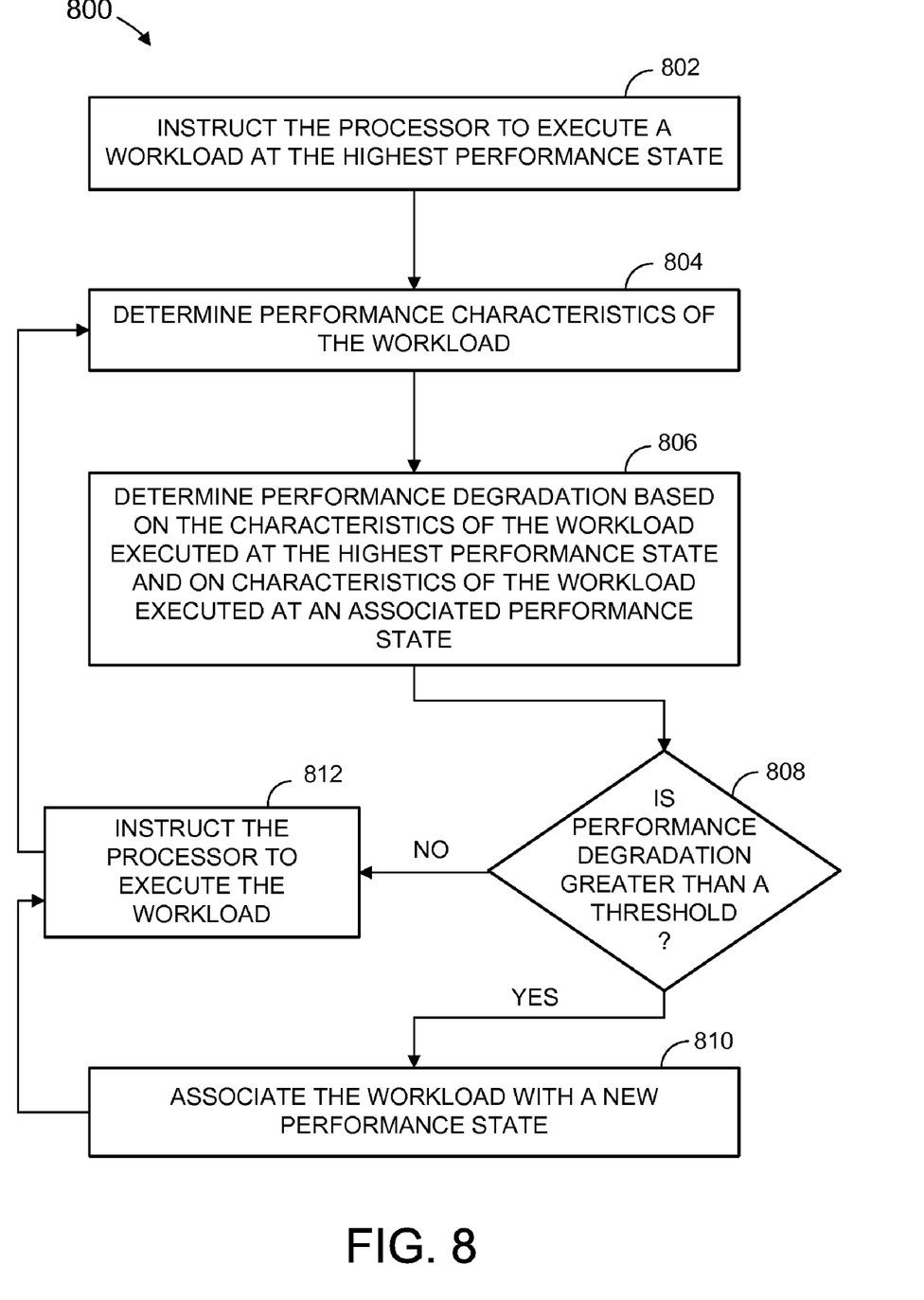
FIG. 8 is a flow diagram of a method according to some embodiments.

FIG. 8 is a flow diagram of process 800 according to some embodiments. Process 800 may be executed periodically during execution of process 400. According to some embodiments, process 800 may be executed to determine whether a processor performance state associated with a workload provides suitable performance, and, if not, to change the processor performance state associated with the workload.

In more detail, a processor is instructed at 802 to execute a workload at a highest processor performance state. In some embodiments, the workload has previously been associated with a processor performance state, and the highest processor performance state is associated with higher power consumption than the associated processor performance state.

Performance characteristics of the workload are determined at 804. The performance characteristics may be determined using any system mentioned herein or known to those in the art. The performance characteristics may be different than those acquired during process 400, and/or may be related to a time period required for completion of the workload (i.e., throughput).

Next, at 806, a performance degradation is determined based on the characteristics of the workload as executed at the highest performance state and on characteristics of the workload as executed at its associated performance state. The performance degradation may be determined and/or quantified in any manner that is or becomes known. In some embodiments, the performance degradation reflects a difference between a time required to execute the workload at the highest performance state and a time required to execute the workload at the associated performance state.

Flow then proceeds to 808. If the performance degradation is greater than a threshold amount, the processor is instructed at 810 to associate the workload with a new performance state. The new performance state may be associated with greater power consumption than the originally-associated performance state. The new performance state may be identical to the highest performance state. In some embodiments of 810, the workload is associated with a cluster that is in turn associated with the new performance state.

The processor is then instructed at 812 to execute the workload. The workload is executed at the new performance state if the determination at 808 was positive. If the determination at 808 was negative, flow proceeds directly to 812 to instruct the processor to execute the workload at its originally-associated power state. Flow then returns to 804 and proceeds as described above.

Figure 9:
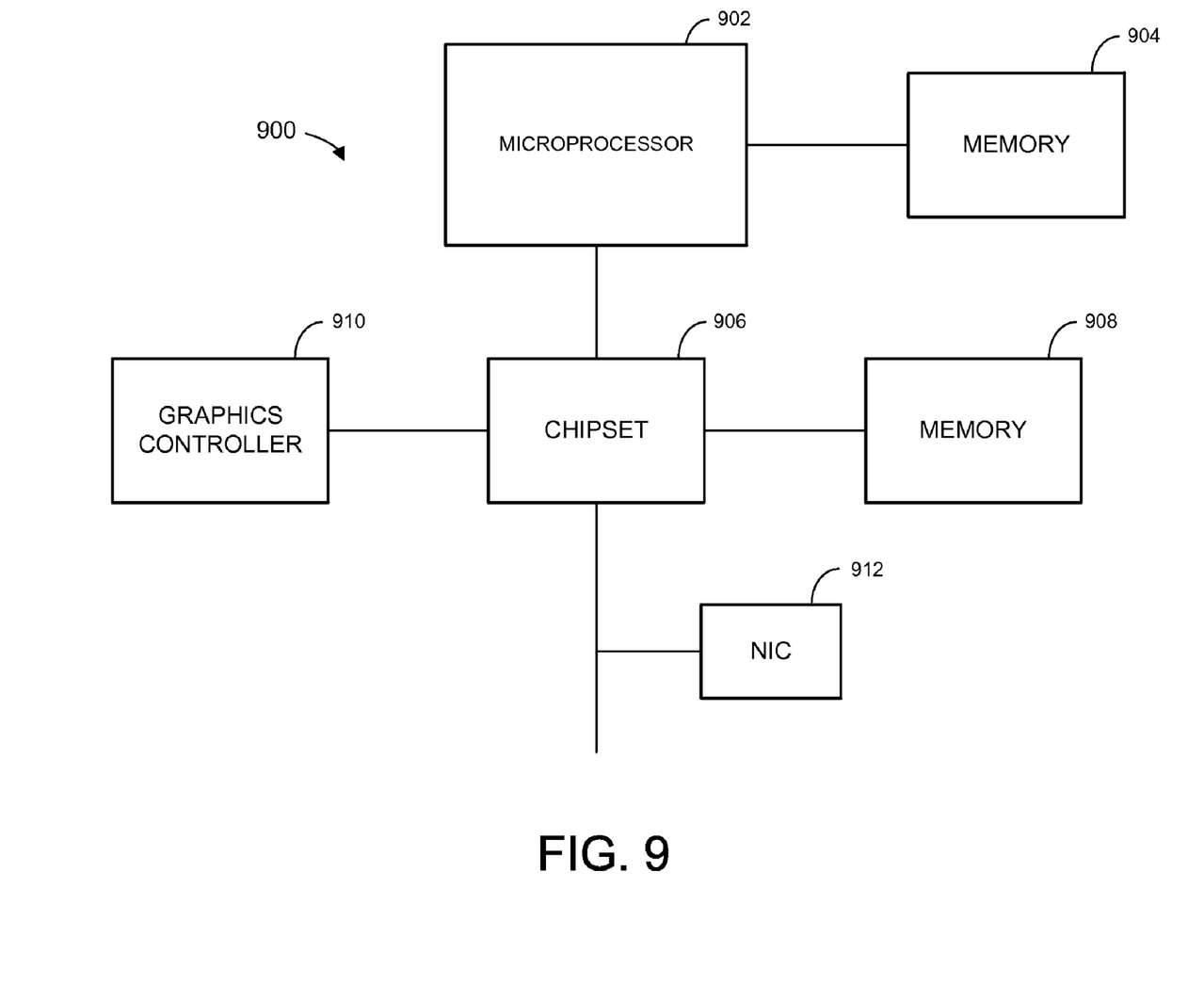
FIG. 9 is a block diagram of a system according to some embodiments.

FIG. 9 illustrates a block diagram of system 900 according to some embodiments. System 900 includes microprocessor 902 which may comprise a Pentium®, RISC-based, or other type of processor. Microprocessor 902 may communicate directly with system memory 904, which may comprise any type of memory including but not limited to Single Data Rate Random Access Memory and Double Data Rate Random Access Memory. Program code may be executed by microprocessor 902 from memory 904 to perform the methods described herein. Microprocessor 902 may communicate with chipset 906 and with other off-die functional units, such as memory 908, graphics controller 910 and Network Interface Controller (NIC) 912 via chipset 1108.

The aforementioned program code may be read from a computer-readable medium, such as a floppy disk, a CD-ROM, a DVD-ROM, a Zip™ disk, a magnetic tape, or a signal encoding the process steps, and thereafter stored in memory 908 in a compressed, uncompiled and/or encrypted format. In alternative embodiments, hard-wired circuitry may be used in place of, or in combination with, program code for implementation of the processes described herein. Thus, embodiments are not limited to any specific combination of hardware and software.

Although ACPI performance states have been used herein as an example, embodiments may be associated with any type of selectable processor performance state. Moreover, although specific components have been described as performing specific functions, any of the functions described herein might be performed by a software application, a hardware device, an OS, a driver, and/or a BIOS.

The several embodiments described herein are solely for the purpose of illustration. Persons skilled in the art will recognize from this description other embodiments may be practiced with modifications and alterations limited only by the claims.

What is claimed is:
1. A method comprising:
    determining a processor performance characteristic associated with each of a plurality of workloads;
    determining a plurality of clusters based on the determined processor performance characteristic for each of the workloads, each of the clusters comprising one or more of the workloads having similar performance characteristic;
    associating a processor performance state with each of the determined clusters, each processor performance state to minimize a processor power requirement of the associated cluster while achieving a desired performance of the workload and each processor performance state associated with a different power consumption; and
    executing, by the processor, each of the workloads of each cluster at the associated processor performance state of the cluster.

2. A method according to claim 1, wherein determining the processor performance characteristic comprises:
reading of at least one of an operating system counter, a processor counter, a chipset counter, or a device-level counter, and wherein the at least one of an operating system counter, a processor counter, a chipset counter, or a device-level counter is associated with efficiency of a processor with respect to a workload.

3. A method according to claim 1, wherein the processor performance characteristic comprises a level two cache miss ratio.

4. A method according to claim 1, wherein the processor performance characteristic comprises an input/output queue depth.

5. A method according to claim 1, further comprising:
determining a processor performance characteristic associated with each executed workload at the associated processor performance state.

6. A method according to claim 5, further comprising:
executing, by the processor, each of the workloads of each cluster at a highest processor performance state, the highest processor performance state having a highest power consumption for the processor;
determining a processor performance characteristic associated with each of the workloads executed at the highest processor performance state; and
determining, for each of the workloads of each cluster, a performance degradation based on the processor performance characteristic associated with the highest processor performance state and the processor performance characteristic associated with the associated performance state,
wherein the highest processor performance state is different from the first associated processor performance state.

7. An apparatus comprising:
a memory storing processor-executable program code; and
a processor in communication with the memory and operative in conjunction with the stored program code to:
determine a processor performance characteristic associated with each of a first plurality of workloads;
determine a plurality of clusters based on the determined processor performance characteristic for each of the workloads, each of the clusters comprising one or more of the workloads having similar performance characteristic;
associate a processor performance state with each of the determined clusters, each processor performance state to minimize a processor power requirement of the associated cluster while achieving a desired performance of the workload and each processor performance state associated with a different power consumption; and
execute each of the workloads of each cluster at the associated processor performance state of the cluster.

8. An apparatus according to claim 7, wherein determination of the processor performance characteristic comprises:
reading of at least one of an operating system counter, a processor counter, a chipset counter, or a device-level counter, and wherein the at least one of an operating system counter, a processor counter, a chipset counter, or a device-level counter is associated with efficiency of a processor with respect to a workload.

9. An apparatus according to claim 7, wherein the processor performance characteristic comprises a level two cache miss ratio.

10. An apparatus according to claim 7, wherein the processor performance characteristic comprises an input/output queue depth.

11. An apparatus according to claim 7, the processor further operative in conjunction with the stored program code to:
determine a processor performance characteristic associated with executed-workload at the associated processor performance state.

12. An apparatus according to claim 11, the processor further operative in conjunction with the stored program code to:
execute each of the workloads of each cluster at a highest processor performance state, the highest processor performance state having a highest power consumption for the processor;
determine a processor performance characteristic associated with each of the workloads executed at the highest processor performance state; and
determine, for each of the workloads of each cluster, a performance degradation based on the processor performance characteristic associated with the highest processor performance state and the processor performance characteristic associated with the associated performance state,
wherein the highest processor performance state is different from the associated processor performance state.

13. An apparatus according to claim 12, the processor further operative in conjunction with the stored program code to:
determine a processor performance characteristic associated with each executed workload at the associated processor performance state;
execute each of the workloads of each cluster at a highest processor performance state, the highest processor performance state having a highest power consumption for the processor;
determine a processor performance characteristic associated with each of the workloads executed at the highest processor performance state; and
determine, for each of the workloads of each cluster, a performance degradation based on the processor performance characteristic associated with the highest processor performance state and the processor performance characteristic associated with the associated performance state,
wherein the highest processor performance state is different from the associated processor performance state.

14. An apparatus comprising:
a double data rate memory storing processor-executable program code; and
a processor in communication with the memory and operative in conjunction with the stored program code to:
determine a processor performance characteristic associated with each of a plurality of workloads;
determine a plurality of clusters based on the determined processor performance characteristic for each of the workloads, each of the clusters comprising one or more of the workloads having similar performance characteristic;
associate a processor performance state with each of the determined clusters, each processor performance state to minimize a processor power requirement of the associated cluster while achieving a desired performance of the workload and each processor performance state associated with a different power consumption; and
execute each of the workloads of each cluster at the associated processor performance state of the cluster.

15. An apparatus according to claim 14, the processor further operative in conjunction with the stored program code to:
- determine a processor performance characteristic associated with each executed workload at the associated processor performance state;
- execute each of the workloads of each cluster at a highest processor performance state, the highest processor performance state having a highest power consumption for the processor;
- determine a processor performance characteristic associated with each of the workloads executed at the highest processor performance state; and
- determine, for each of the workloads of each cluster, a performance degradation based on the processor performance characteristic associated with the highest processor performance state and the processor performance characteristic associated with the associated performance state, wherein the highest processor performance state is different from the associated processor performance state.

* * * * *